United States Patent
Yamamoto et al.

(10) Patent No.: US 9,063,526 B2
(45) Date of Patent: Jun. 23, 2015

(54) RADIO CONTROL DEVICE FOR TARGET OBJECT TO BE CONTROLLED

(75) Inventors: Michio Yamamoto, Chiba-ken (JP); Takahiro Isono, Chiba-ken (JP); Kota Toyotomi, Chiba-ken (JP); Masahiro Tanaka, Chiba-ken (JP)

(73) Assignee: FUTABA CORPORATION, Chiba-Ken (JP)

( * ) Notice: Subject to any disclaimer, the term of this patent is extended or adjusted under 35 U.S.C. 154(b) by 213 days.

(21) Appl. No.: 13/465,112

(22) Filed: May 7, 2012

(65) Prior Publication Data

US 2012/0286941 A1 Nov. 15, 2012

(30) Foreign Application Priority Data

May 9, 2011 (JP) ................. 2011-104525

(51) Int. Cl.
*G05B 11/01* (2006.01)
*G05B 17/02* (2006.01)
*H04N 7/18* (2006.01)
*A63H 30/04* (2006.01)
*G08C 17/02* (2006.01)
*G06F 3/038* (2013.01)
*G06F 3/01* (2006.01)

(52) U.S. Cl.
CPC ............... *G05B 17/02* (2013.01); *H04N 7/183* (2013.01); *G06F 3/038* (2013.01); *G06F 3/017* (2013.01); *A63H 30/04* (2013.01); *G08C 17/02* (2013.01)

(58) Field of Classification Search
CPC ....... G05B 11/01; A63H 30/00; A63H 30/04; G08C 17/02; G08C 2201/93; H04N 7/183; G06F 3/017; G06F 3/038; G06F 3/0383; G06F 2203/0384
See application file for complete search history.

(56) References Cited

U.S. PATENT DOCUMENTS

| 6,445,333 B1* | 9/2002 | Tanaka .......................... 341/176 |
| 2011/0170742 A1* | 7/2011 | Fukuchi et al. ............... 382/103 |
| 2011/0234386 A1* | 9/2011 | Matsuda ..................... 340/12.54 |
| 2012/0015686 A1* | 1/2012 | Krupnik ..................... 455/550.1 |

* cited by examiner

Primary Examiner — John A Tweel, Jr.
Assistant Examiner — Adnan Aziz
(74) Attorney, Agent, or Firm — Bacon & Thomas, PLLC

(57) ABSTRACT

A radio control device for one or more target objects to be controlled includes an manipulation unit, configured to control the target objects; a storage unit which stores model data corresponding to the target objects, the model data being used to control the target objects; a controller which uses the model data stored in the storage unit to control the target objects through manipulation of the manipulation unit; and a camera module which acquires specific data for specifying the target objects. The controller stores the specific data of the target objects acquired by the camera module and the model data of the target objects related to the specific data in the storage unit in association therebetween such that the specific data and the model data are callable from the storage unit.

6 Claims, 8 Drawing Sheets

NEW MODEL CREATION

CAMERA PHOTOGRAPHING

MODEL SELECTION (THUMBNAIL SCREEN)

CAMERA PHOTOGRAPHING

MODEL SELECTION (LIST SCREEN)

THUMBNAIL SCREEN

MODEL SELECTION (LIST SCREEN)

RADIO CONTROL DEVICE FOR TARGET OBJECT TO BE CONTROLLED

FIELD OF THE INVENTION

The present invention relates to a radio control device for a target object to be controlled, and more particularly, to a user-friendly radio control device which is capable of storing model data in association with target objects to be controlled and controlling one selected from the target objects by calling and using model data corresponding to the selected target object without making errors.

BACKGROUND OF THE INVENTION

A radio control device for radio control of target objects to be controlled, such as airplanes, helicopters and the like, includes a manipulation unit such as a stick lever to control the target objects by actuate a driving source such as an engine or the like, or a servo motor to drive a key or the like. Depending on the kinds of target objects to be controlled (e.g., airplanes, gliders, helicopters and the like), roles (control targets) assigned to manipulation units and manipulation properties of manipulation units (e.g., relationships between manipulations for control of the control targets and movements of the control targets) are varied.

Specifically, the phrase "roles assigned to manipulation units" indicates the control targets assigned to the manipulation units, for example, which stick levers respectively are assigned for controls of an aileron and a rudder. Further, the phrase "manipulation properties of manipulation units" indicates, e.g., a relationship between a manipulation of a stick lever to control a servo motor and a movement of a rudder driven by the servo motor.

For example, this relationship may be a linear proportional relationship or a quadratic functional relationship. The roles assigned to manipulation units and the manipulation properties of the manipulation units are typically varied depending on use purposes of target objects to be controlled (for example, whether the target objects are for use in contest or industry) or, e.g., running purposes of competitive games (for example, whether the contest is regular contest or speed contest). Information required for control of the target objects, such as the roles assigned to manipulation units and the manipulation properties of the manipulation units, is generally referred to as "model data."

If one radio control device is used to control two or more target objects to be controlled, it is common that model data for the target objects are prepared and beforehand stored in a memory of the radio control device, model data corresponding to a target object to be controlled are called from the memory and set in the device, and the target object are controlled under appropriate conditions, Japanese Patent Application Publication No. 2010-233725 discloses a radio control device which is capable of randomly changing model data in association with target objects. The radio control device disclosed in the above-cited reference includes a radio control transmitter capable of easily setting and changing target objects. This radio control transmitter stores setting information related to relationships between manipulation contents of, e.g., a stick lever and a switch lever and operation contents of target objects. If a user turns on a power switch by pressing one of three direct buttons, a setting information associated with each direct button is read. As a result, the user can change settings when turning on the radio control device and immediately start the control of a desired target object.

However, in the above conventional radio control device, there is a problem of complicated operation of associating any model data with a target object to be controlled and storing such association in the device. In addition, even when a user is willing to perform such complicated operation to store the association between model data and names of target objects in a memory of the device, if the user attempts to call a model data corresponding to a desired target object from the memory, table-form information in which model names and model data of target objects are associated with each other is displayed on a display of the device and the user is required to select model data by referring to the table-form information. Accordingly, if the user cannot remember the name or model number of the desired target object, it is difficult to immediately select the model data corresponding to the target object.

In this regard, for easy access to a relationship between model data and target objects to be controlled using the model data, the present inventors have proposed a radio control device using an external storage medium which stores image data of target objects. According to a system using this radio control device, a user first obtains image data of a target object by means of a digital camera and then installs an external storage medium storing the image data in the radio control device. This radio control device can display the image data stored in the installed external storage medium as an image and store model data selected from the device and the image data of the displayed image in an internal memory in association therebetween.

Accordingly, after such association between the image data and the model data is set, the external storage medium is installed in the device. Then, the image data are displayed on a display unit and a target object to be controlled is selected based on the displayed image data. As a result, it is possible to call model data corresponding to the selected target object from the internal memory and set the called model data in the device.

However, the above proposed radio control device requires a separate digital camera for acquiring image data of target objects. In addition, the image data acquired by the digital camera need to be stored in the above-described external storage medium so that the image data can be read in the radio control device. In this case, if the digital camera employs an external storage medium that is different from that of the radio control device, there is a need to store the image data of the digital camera in the external storage medium of the radio control device via a personal computer. In addition, if the image data of the digital camera is not compatible with the radio control device, when the image data of the digital camera are transferred to the external storage medium of the radio control device via the personal computer, there is a need to convert the image data of the digital camera into a format that is readable by the radio control device.

As described above, the above proposed radio control device requires the digital camera and the personal computer additionally and has a problem of complicated operation of associating target object model data with a target object to be controlled.

SUMMARY OF THE INVENTION

In view of the above, the present invention provides a radio control device with high convenience and performance, which requires no additional external device and is capable of storing model data and corresponding target objects in association therebetween and calling and setting model data corresponding to a desired target object with no mistake for immediate use.

In accordance with an aspect of the present invention, there is provided a radio control device for one or more target objects to be controlled. The device includes an manipulation unit configured to control the target objects; a storage unit which stores model data corresponding to the target objects, the model data being used to control the target objects; a controller which uses the model data stored in the storage unit to control the target objects through manipulation of the manipulation unit; and a camera module which acquires specific data for specifying the target objects. The controller stores the specific data of the target objects acquired by the camera module and the model data of the target objects related to the specific data in the storage unit in association therebetween such that the specific data and the model data are callable from the storage unit.

The radio control device may further include a setting unit for calling the model data stored in the storage unit or modifying the model data called from the storage unit; and a display unit for displaying the specific data and the model data of the target objects stored in the storage unit in association therebetween together.

The specific data may be image data of the target objects.

The specific data may be identification data read from unique identification codes of the target objects, the identification codes being attached to the target objects.

In accordance with the aspect of the present invention, when a user obtains an image of a target object by means of the camera module of the radio control device, the radio control device can acquires specific data for specifying the target object. The controller of the radio control device stores the specific data of the target objects acquired by the camera module and the target object model data related to the specific data in the storage unit in association therebetween.

If two or more target objects and corresponding model data are stored in the storage unit in association therebetween and model data used to control a particular one of the target objects are set in the radio target device, the user can select the particular target object based on the specific data stored in the storage unit, call the model data associated with the specific data corresponding to the selected target object, and set the called model data in the device for control of the target object. The operation of acquiring the target object specific data can be performed by only the radio control device, the association of the specific with the target object can be easily performed, and the model data corresponding to the target object to be controlled can be reliably called and set with no mistake.

In accordance with the aspect of the present invention, when the association of the target object specific data acquired by the camera module with the model data is performed, the specific data are visually displayed on the display unit so that the user can verify target objects with his/her eyes, thereby making few errors in the association or relationship. In this case, the user can manipulate the setting unit to call the model data corresponding to the target object from various model data pre-stored in the storage unit and associate the called target object model data with the specific data.

In addition, if two or more specific data and corresponding model data are stored in the storage unit in association therebetween and model data used to control a particular one of the target objects are set in the radio target device, the specific data stored in the storage unit are visually displayed on the display unit so that the user can verify the displayed specific data with his/her eyes and selects a desired target object. Accordingly, the model data corresponding to the target object to be controlled can be reliably called and set in the device with no mistake. In addition, the user can manipulate the setting unit to modify the called model data in time.

In accordance with the aspect of the present invention, a target object is specified by image data of target object. Accordingly, when the operation of association of the image data of the target object acquired by the camera module with the model data is performed and model data used to control a corresponding target object are set in the radio control device after the association of the image data with the model data is stored in the storage unit, an image of the corresponding target object is visually displayed on the display unit so that the user can verify and select a desired target object with its image, which may result in fewer mistakes in selecting model data.

In accordance with the aspect of the present invention, as the camera module reads the unique identification codes attached to the target objects, the radio control device can the identification data for specifying the target objects. When the operation of association of the identification data of the target object acquired by the camera module with the model data is performed and model data used to control a corresponding target object are set in the radio control device after the association of the identification data with the model data is stored in the storage unit, the identification data of the corresponding target object are visually displayed on the display unit so that the user can verify and select a desired target object, which may result in fewer mistakes in selecting model data.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

A radio control device in accordance with a first embodiment of the present invention will now be described with reference to FIGS. 1 to 6G.

Figure 2:
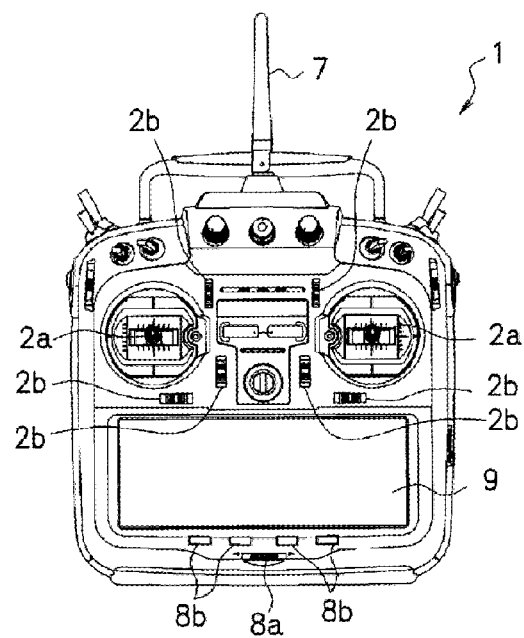
FIG. 2 is a front view of the radio control device.
Figure 3:
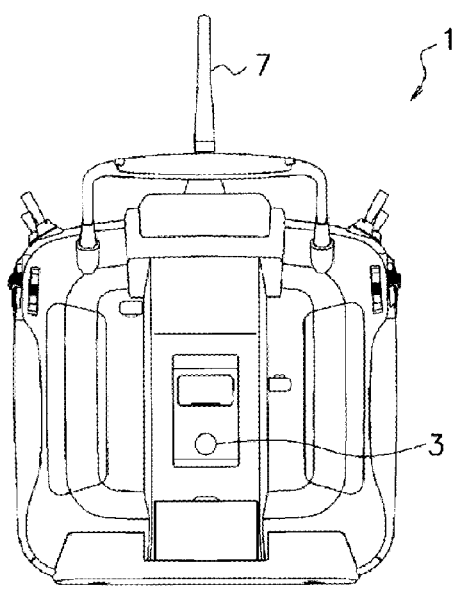
FIG. 3 is a rear view of the radio control device.

A configuration of the radio control device will be first described with reference to FIGS. 1 to 3.

Figure 1:
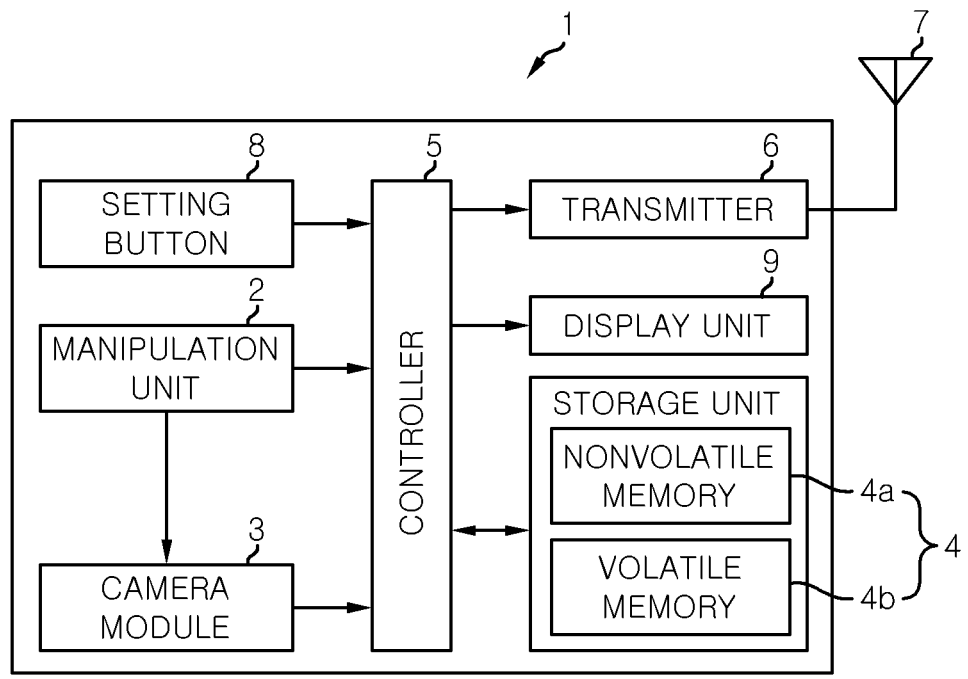
FIG. 1 is a functional block diagram of a radio control device in accordance with an embodiment of the present invention.

As shown in a functional block diagram of FIG. 1, radio control device 1 includes a manipulation unit 2 operated by a user who controls a target object (not shown) such as an airplane or the like. An example of the manipulation unit 2 may include a pair of left and right stick levers 2*a* as shown in FIG. 2, six trim switches 2*b* as shown in FIG. 2, other switches, buttons, levers and the like. The user may manipulate the manipulation unit 2 to control the target object by actuating a driving source such as an engine, and a servo motor and the like to drive a rudder and the like, equipped in the target object. The manipulation unit 2 may be a touch panel of a display unit 9 which will be described later.

As shown in FIG. 1, the radio control device 1 includes a camera module 3 for acquiring specific data to specify a target object. As used herein, the term "specific data" indicates data for discriminating between target objects to be controlled. In this embodiment, the specific data are image data of the target object. The user can select a desired target object by seeing an image even if he/she forgets a name or model number of a target object to be controlled. The camera module 3 may be operated by either the stick levers 2a or the trim switches 2b in the manipulation unit 2. The operation of the camera module 3 using either the stick levers 2a or the trim switches 2b in the manipulation unit 2 may be arbitrarily set by manipulating a setting button or the like which will be described later, and the setting may be stored in a storage unit which will be described later.

As shown in FIG. 1, the radio control device 1 includes a storage unit 4 which stores data for controlling the target objects. The storage unit 4 includes a nonvolatile memory 4a such as FROM, EEPROM or the like, and a volatile memory 4b such as RAM or the like. The volatile memory 4a in the storage unit 4 stores model data corresponding respectively to the target objects to be controlled by the user, and system data which are used to perform the control by the radio control device 1, the system data being common to all of the model data.

As used herein, the term "model data" is as described in "Background of the Invention." In this embodiment, since it is assumed that one radio control device 1 controls two or more target objects, two or more types of model data are stored in advance. The model data may have default values or alternatively, may be customized by manipulating setting buttons, which will be described later, to meet actual conditions of use of the target objects and the like.

Image data of the target objects obtained from the camera module 3, which will be described in more detail later, and data which represent association or correspondence of the model data, which will be described in more detail later, and the image data are also stored in the nonvolatile memory 4a. As used herein, the phrase data which represent association of the model data and the image data are stored in the nonvolatile memory 4a" indicates that the model data and the image data are stored in the nonvolatile memory 4a in association therebetween. The volatile memory 4b serves as a space to develop various types of data and to be used and processed by a control unit.

As shown in FIG. 1, the radio control device 1 includes a controller 5. The controller 5 has a function of generating a control signal for controlling target objects and driving a transmitter 6 (RF circuit) to transmit a radio signal from an antenna 7 to the target objects, based on the system data and model data stored in the storage unit 4 and an operation signal sent from the manipulation unit 2.

In this embodiment, the controller has an image photographing control function of controlling the camera module 3 to obtain an image data of a desired target object in accordance with an instruction from the manipulation unit 2. In addition, the controller 5 has a setting function of storing the image data and the model data in the storage unit 4 in association therebetween and a model data selecting function of setting, in the device, model data corresponding so selected image data of the storage unit 4 to perform the control of the target objects as necessary. Moreover, the controller 5 has a display control function of controlling the display unit 9 to display required data.

As shown in FIG. 1, the radio control device 1 includes a setting button 8 serving as a setting unit which calls the model data stored in the storage unit 4 or corrects model data called from the storage unit 4. The setting button 8 may be a dedicated button (such as a dial 8a, an manipulation switch 8b or the like) provided in a body of the radio control device 1 or a touch panel of the display unit 9, which will be described later, as shown in FIG. 2.

As shown in FIG. 1, the radio control device 1 includes the display unit 9. The display unit 9 displays a variety of information (including images) required or useful for the radio control device 1. As will be described in detail later, the display unit 9 can display image data of available target objects and model data thereof at once, display target object image data stored in the storage unit 4 one by one or in the form of a thumbnail. Alternatively, the display unit 9 can act as a finder when images of the target objects are photographed by the camera module 3, or display the photographed image of the target objects. In addition, the display unit 9 may include a touch panel type button. At least a portion of this touch panel may be used as the above-described manipulation unit 2 or setting button 8.

Next, the setting function of the controller 5 in the radio control device 1, that is, the function of storing the image data and the model data of the target objects in the storage unit 4 in association therebetween, will be described with reference to FIG. 4.

Figure 4:
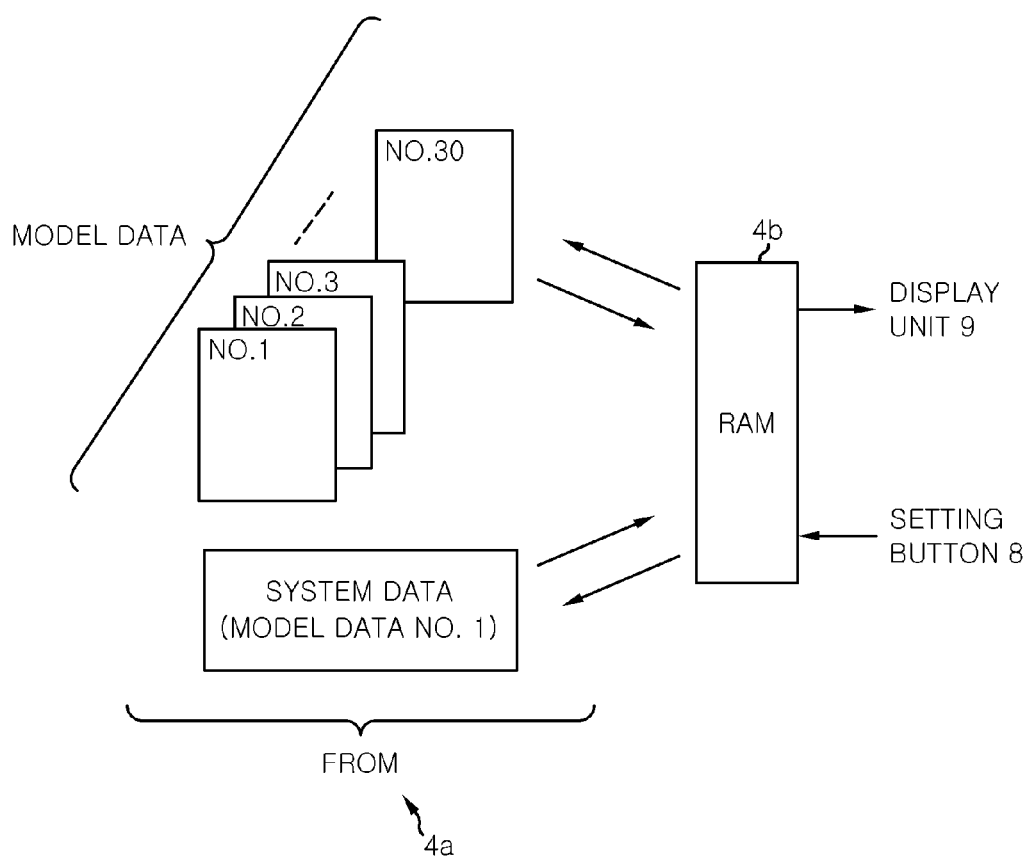
FIG. 4 is schematic view for explaining a configuration of a storage unit, a data structure thereof, and a flow of data or signals around the storage unit in the radio control device.

FIG. 4 shows contents of data stored in the nonvolatile memory (e.g., FROM) 4a, exchange of data between the nonvolatile memory 4a and the volatile memory (e.g., RAM) 4b, exchange of data and signal between the display unit 9, the setting button 9 (the touch panel of the display unit 9, dial 8a, manipulation switch 8b or the like), and the volatile memory 4b, the exchanges being indicated by arrows. The exchange of data and signal is carried out through the controller 5, as will be described below, and therefore, the arrows in FIG. 4 indicate the functions of the controller 5.

System data and model data (in this example, 30 types of model data from No. 1 to No. 30) are beforehand stored in the nonvolatile memory 4a. The system data are set in association with the model data No. 1 used in default. In case where the radio control device 1 is initially used under a state where the model, data and the image data are not interlinked, the system data and its associated model data No. 1 of the nonvolatile memory 4a are read by the volatile memory 4b when the radio control device is switched on.

Here, the setting button 3 may be manipulated to modify contents of the model data and system data in the volatile memory 4b. The modified data may be stored in the nonvolatile memory 4a. In addition, the contents of the model data and system data may be displayed on the display unit 9 by manipulating the setting button 8.

Although not shown in FIG. 4, by manipulating the manipulation unit shown in FIG. 1, the camera module 3 may be operated to store image data of target objects acquired by the camera module 3 in the nonvolatile memory 4a. In addition, the model data and the image data are stored in the nonvolatile memory 4a (FROM) in association therebetween by laying out the target object image data acquired by the camera module 3 on the volatile memory 4b through the manipulation unit 2 under a state where model data are called from the nonvolatile memory 4a to the volatile memory 4b by manipulating the setting button 8. Besides, the model data, the system data, the image data, and data representing a correspondence therebetween may be stored in either the nonvolatile memory 4a or an external storage medium (e.g., a memory card) which is removably connected to the radio control device 1.

Next, a sequence of new registration of model data in the radio control device 1 will be described with reference to FIGS. 5A to 5F.

Figure 5A:
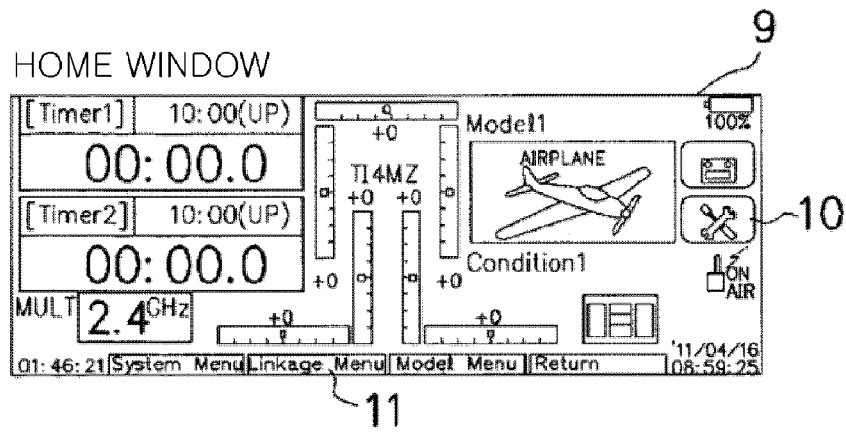
FIGS. 5A to 5F show screens of a display unit in the radio control device, specifically showing a sequence of manipulation for new registration of model data and movement of manipulation screens.

FIG. 5A shows a home screen. When a power switch of the radio control device 1 is ON, the home screen is displayed on the display unit 9. When the home screen is displayed as shown in FIG. 5A, the system data and the associated model data No. 1 are called from the nonvolatile memory 4a and laid out on the volatile memory 4b under a default state, and then are converted into a state where target can be performed with the default model data No. 1, as described above. In this example, since it is assumed that no model data is not yet actually registered for target objects, new registration is performed with the home screen as a starting point. First, a linkage button 10 in the right and top of the home screen or a linkage menu 11 in bottom menu buttons is pressed to change the home screen to a linkage menu screen shown in FIG. 5B.

Figure 5B:
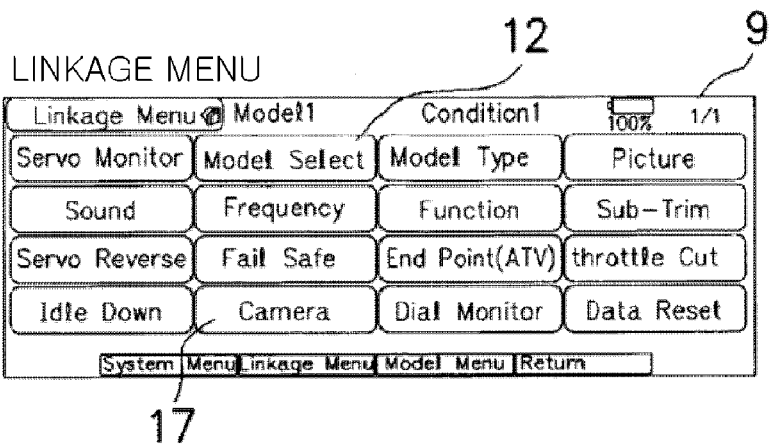
Figure 5C:
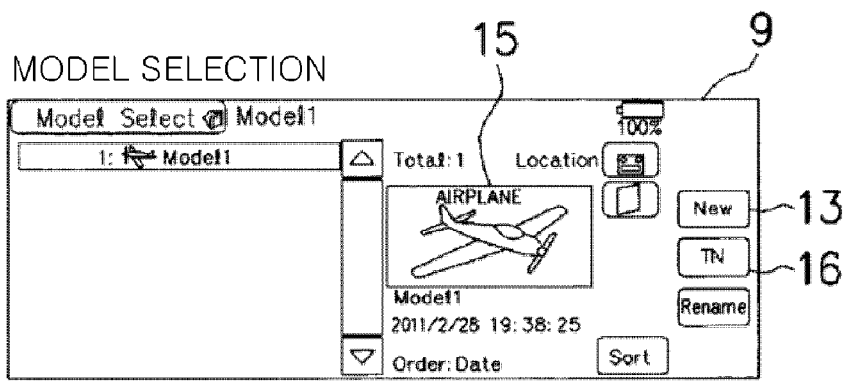

When a model selecting button 12 is selected from a variety of menu buttons shown in the linkage menu screen of FIG. 5B, this screen is changed to a model selecting screen shown in FIG. 5C.

The model selecting screen of FIG. 5C serves to change the model data No. 1 which are called from the nonvolatile memory 4a and laid out in the volatile memory 4b under the default state. When a new model creating button 13 in the model selecting screen is pressed, the model selecting screen is changed to a new model creating screen shown in FIG. 5D.

Figure 5D:
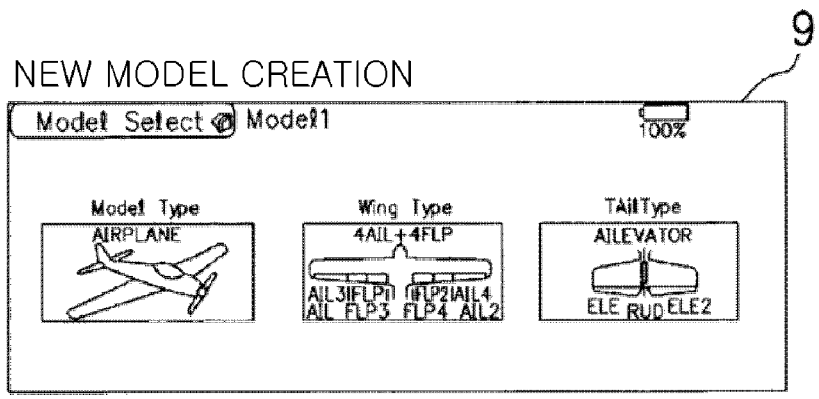

In the new model creating screen of FIG. 5D, e.g., an airplane image is displayed in the left column, the airplane image serving as an image corresponding to this model data, which is displayed as a default image in this example. Similarly, the middle column shows an image for selecting and setting a variation (wing type) of settings and combinations of a rudder and the like in the main wings of the airplane, and the right column shows an image for selecting and setting a variation (tail type) of settings and combinations of the rudder and the like in the tail wings of the airplane. One of these types may be selected and set depending on an instruction from the screen.

In addition to the settings of the shown main wings or tail wings, it is possible to select and set a correspondence relationship (linear, quadratic curvelinear or other relationship) between a stick lever manipulation and a rudder movement by the servo motor, for example. In this new model creating screen, the data are under default if modification or renewal of the data are not carried out. When the manipulation of this screen is completed, this screen is changed to an image photographing screen shown in FIG. 5E.

Figure 5E:
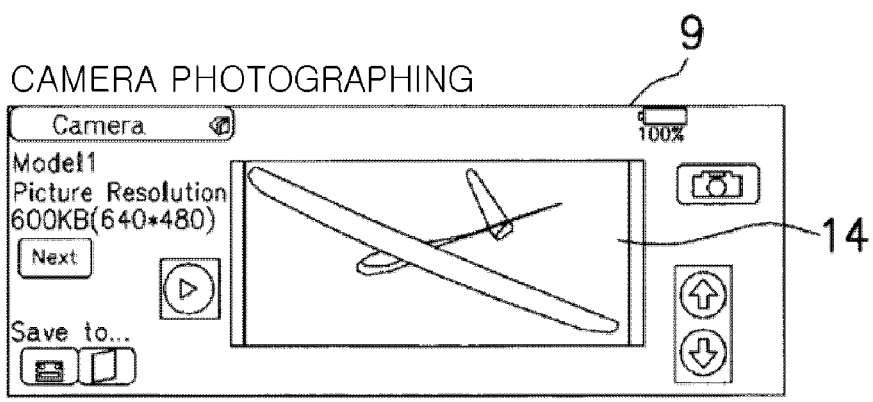

In the image photographing screen of FIG. 5E, a portion of this screen acts as a finder 14 and displays an image of a target object acquired by the camera module 3. While watching this image, a user manipulates the setting button 8 allocated to a shutter of the camera module 3 to photograph the target object with the camera module 3. Image data obtained by photographing the target object are displayed on the display unit 9. At the same time, by laying out the image data on the volatile memory 4b under a state where the model data are laid out on the volatile memory 4b, the model data and the image data are automatically stored in the nonvolatile memory 4a in association therebetween. Then, the screen of the display unit 9 is changed to the model selecting screen of FIG. 5C where an airplane image displayed on a small window 15 is changed to an actually photographed image of the target object (glider image) in the screen of FIG. 5E.

The manipulations of FIGS. 5C to 5E are repeated several times so associate different model data with image data of different target objects which are to be controlled by the user with the radio control device 1.

Figure 5F:
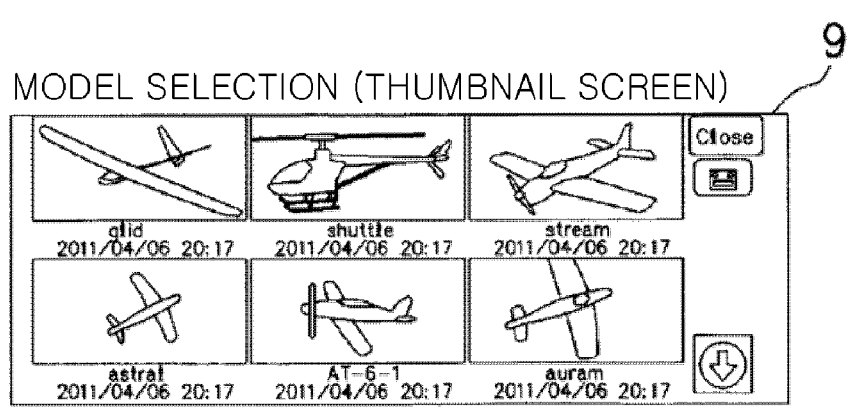

FIG. 5F shows a thumbnail screen for a user to select a desired target object from images, which is displayed as a thumbnail button 16 on the model selecting screen of FIG. 5C is pressed. The user visually determines a desired target object by watching the thumbnail screen and then selects an image thereof. Then, model data associated with the selected target object are called from the nonvolatile memory 4a and laid out on the volatile memory 4b, thereby allowing the radio control device 1 to control the target object by using the model data.

Next, a sequence of storing image data of various types of target objects and registering the image data in association with model data will be described with reference to FIGS. 6A to 6G.

Figure 6A:
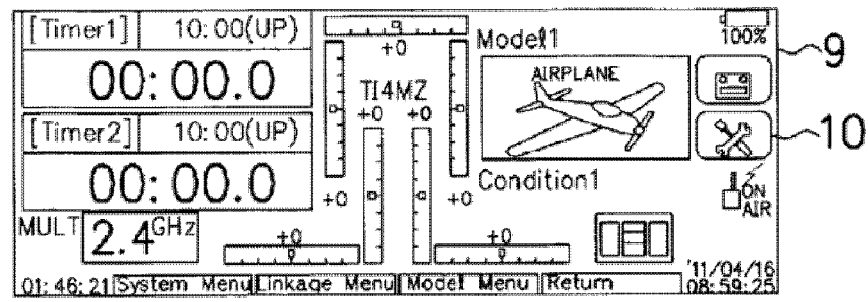
FIGS. 6A to 6G show screens of a display unit in the radio control device, specifically showing a sequence of manipulation for registration of target objects corresponding to registered image data thereof and model data in association therebetween and movement of manipulation screens.

FIG. 6A shows a home screen. A linkage button 10 in the right and top of the home screen or a linkage menu 11 in bottom menu buttons is pressed to change the home screen to the linkage menu screen shown in FIG. 5B, and a camera button 17 in the linkage menu screen is pressed to change the linkage menu screen to an image photographing screen shown in FIG. 6B, 6C or 6D.

Figure 6B:
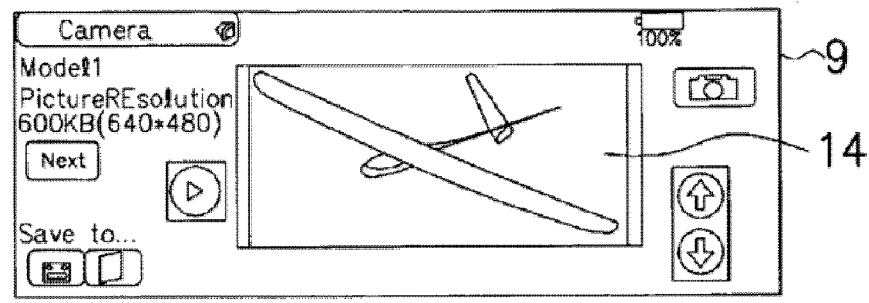
Figure 6C:
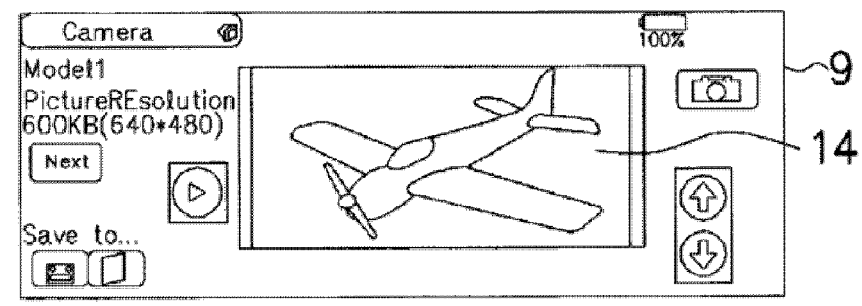
Figure 6D:
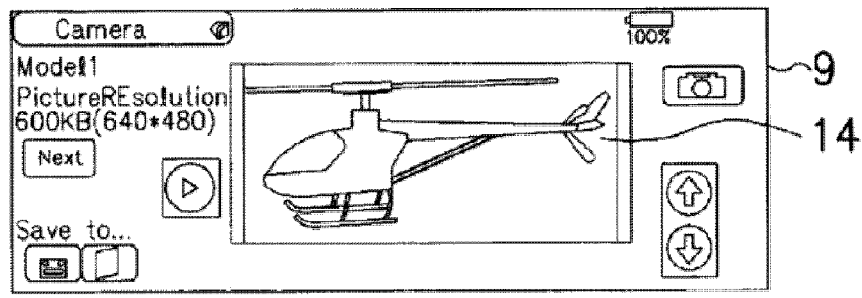

In each of the image photographing screens of FIGS. 6B, 6C and 6D, a portion of the screen acts as a finder 14 and displays an image of a target object acquired by the camera module 3. While watching this image, a user manipulates the setting button 8 allocated to a shutter of the camera module 3 to photograph the target object with the camera module 3. Image data obtained by photographing the target object are displayed on the display unit 9 and are automatically stored in the nonvolatile memory 4a. In this example, as illustrated in FIGS. 6B, 6C and 6D, images of a glider, an airplane, a helicopter and the like are photographed. Thereafter, the image photographing screen is changed to the linkage menu screen of FIG. 5B and then the model selecting button 12 in the linkage menu screen is pressed to change the linkage menu screen to a model selecting screen shown in FIG. 6E.

Figure 6E:
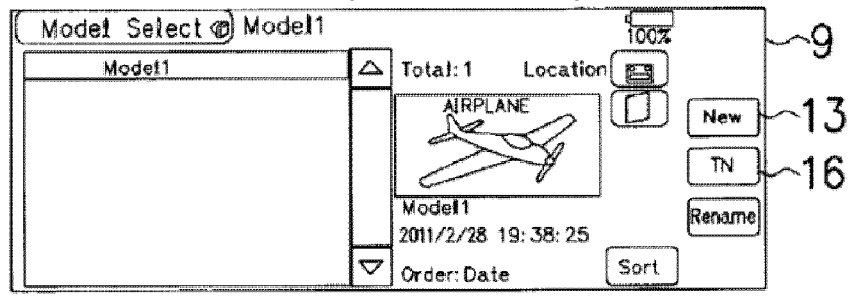

In the model selecting screen of FIG. 6E, only default model data No. 1 called from the nonvolatile memory 4a are selectively displayed. However, if specific model data associated with the image data are previously stored in the storage unit 4, the specific model data are selectively displayed. When desired model data are selected from the displayed model selecting screen, the display unit 9 is automatically changed to a thumbnail screen of FIG. 6F. In this example, the model data No. 1 in the model selecting screen of FIG. 6E are assumed to be suitable for the control of a glider possessed by the user.

Figure 6F:
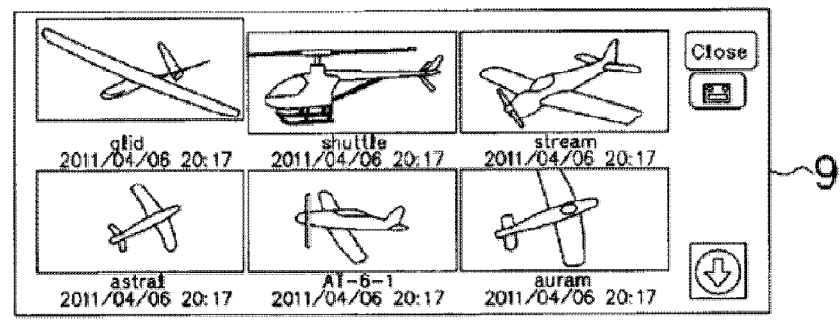
Figure 6G:
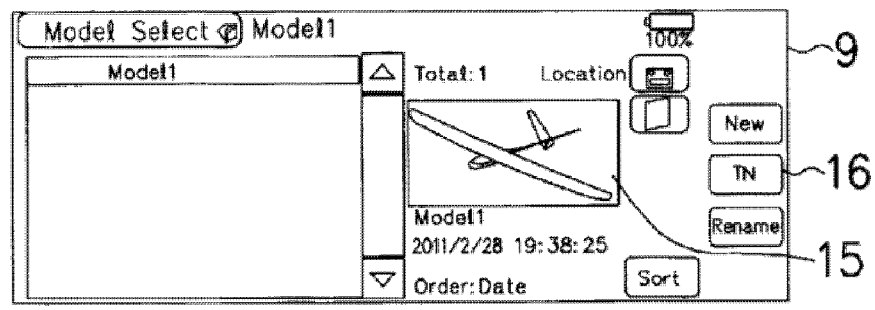

The thumbnail screen of FIG. 6F displays the image data which were acquired in the image photographing screen of FIGS. 6B to 6D but not yet associated with the model data. In this thumbnail screen, the user selects a glider image at a left and top corner as a target object suitable for the model data selected in the model selecting screen of FIG. 6E. Accordingly, this glider image data and the previously selected glide model data are automatically stored in the nonvolatile memory 4a in association therebetween. Then, as shown in FIG. 6G, the display unit 9 is changed to the model selecting screen in which the small window 15 displays the glider image data associated with the model data No. 1.

In the radio control device 1 of this embodiment, one target object image data may be associated with one model data, or two or more target object image data may be associated with one model data. For example, it is assumed that a user possesses two airplanes having the same type and setting and different colors. Although the user visually selects one of the two airplanes on the thumbnail screen depending on the use purpose, model data associated with the selected airplane become equal to model data associated with other airplane. In this case, the two airplanes having the same type and setting and different colors may be associated with two model data having the same contents and different data numbers, respectively.

When the image data and the model data are stored in association therebetween, if the model data are called and associated with other image data, a link of the model data with the previous image data may be removed and the model data may be stored in association with the later image data, or the previous and later image data may be stored in association with the same model data.

As described above, in accordance with this embodiment, since a desired target object is selected based on images obtained by photographing target objects that are in use, there may be a low possibility of mistaken setting of model data.

Next, a radio control device in accordance with a second embodiment of the present invention will be described. In the second embodiment, explanation of the elements common to the first embodiment will be omitted and the explanation of the first embodiment is recited.

This radio control device is characterized in that specific data for identifying and specifying target objects are identification data serving as unique identification codes attached to the target objects. In this embodiment, identification codes which are associated with model data pre-stored in the radio control device and printed on labels are prepared. For example, 30 types of identification codes which are respectively associated with 30 model data of No. 1 to No. 30 pre-stored in the radio control device and printed on labels in the form of a bar code are prepared.

A user manipulates the radio control device in the same sequence as the first embodiment, calls a specified model data, and performs customization that is suitable or required for a specified target object. Next, one label is selected and assigned for the specified target object and is read by the camera module 3. Accordingly, identification data for specifying the specified target object and model data of the specified target object are stored in the storage unit 4 in association therebetween. In regard to other target objects, the similar process of creating model data in the same sequence, attaching labels to the target objects, reading the labels and associating the model, data with identification data is repeated.

When model data are called, and the camera module 3 reads identification codes of labels of target objects and acquires identification data, the model data associated with the identification data are automatically read and set in the device. Thus, in accordance with this embodiment, since labels of different identification codes are attached to different target objects for object identification, there may be few errors in setting of model data.

Although, in the second embodiment, the identification data read from the identification codes printed on the labels are used as the specified data for the reading of the model data, image data of target objects acquired by the camera module 3 may be used as the identification codes. That is, features or characteristics of target objects may be extracted from the image data using an image recognition technique and may be made into codes which can be then used as the specified data for individual identification of the target objects.

In the second embodiment, when unique serial numbers of various radio control devices are coded and added to not only the labels but also model data stored in the radio control devices in association therebetween, a camera module 3 of a different radio control device cannot read identification codes of labels attached to different target objects for association with model data of the different target objects. This can prevent users from erroneously setting model data of target objects other than their own or controlling target objects possessed by other users.

Although, in the above-described embodiments, the target objects have been illustrated with gliders, airplanes and helicopters, they may be hobby models or actual instruments for practical use in the industry.

While the invention has been shown and described with respect to the embodiments, it will be understood by those skilled in the art that various changes and modifications may be made without departing from the scope of the invention as defined in the following claims.

What is claimed is:

1. A radio control device for use with two or more target objects to be controlled, the device comprising:
   a manipulation unit configured to control the target objects;
   a storage unit which stores pieces of model data corresponding to the target objects, each of the target objects being controlled based on a piece of model data;
   a controller which is configured to use the pieces of the model data stored in the storage unit to control the target objects through manipulation of the manipulation unit;
   a camera module which acquires pieces of specific data for specifying the target objects; and
   a display unit,
   wherein, in a setting mode of the device, the controller is configured to store the pieces of the specific data of the target objects acquired by the camera module in association with the pieces of the model data of the target objects in the storage unit, the pieces of the specific data of the target objects and the pieces of the model data of the target objects being stored in a one-to-one corresponding manner or a many-to-one corresponding manner, and
   wherein, in a model data calling mode of the device, the camera module acquires a piece of specific data for one of the target objects, the controller is configured to call a piece of model data corresponding to said one of the target objects from the storage unit based on the acquired piece of specific data for said one of the target objects and to automatically set the called piece of the model data, and the display unit displays the acquired piece of specific data for said one of the target objects and the called piece of model data corresponding to said one of the target objects.

2. The radio control device of claim 1, further comprising;
   a setting unit for modifying the piece of model data called from the storage unit.

3. The radio control device of claim 1, wherein the pieces of specific data are image data of the target objects.

4. The radio control device of claim 2, wherein the pieces of specific data are image data of the target objects.

5. The radio control device of claim 1, wherein the pieces of specific data are identification data read from unique identification codes of the target objects, the identification codes being attached to the target objects.

6. The radio control device of claim 2, wherein the pieces of specific data are identification data read from unique identification codes of the target objects, the identification codes being attached to the target objects.

* * * * *